No. 626,972. Patented June 13, 1899.
T. CRANEY.
ELECTROLYTIC APPARATUS FOR DEPOSITION OF METALS FROM SOLUTION.
(Application filed Jan. 3, 1898.)
(No Model.) 2 Sheets—Sheet 1.
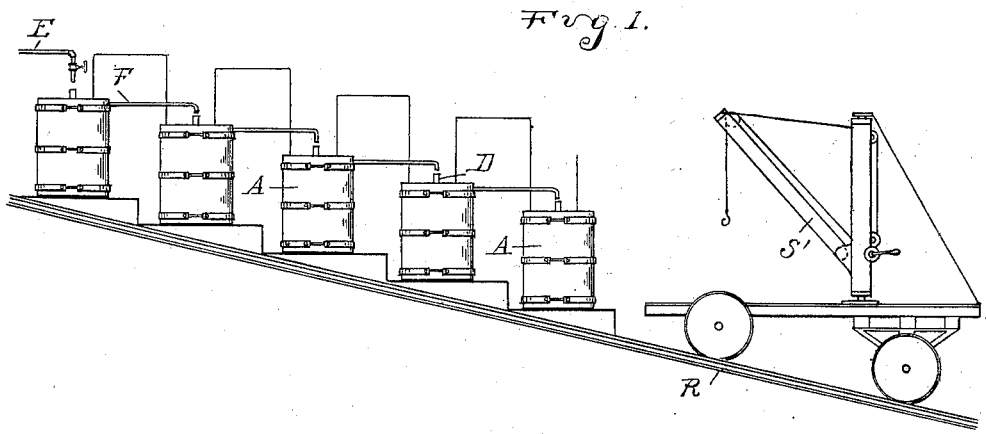
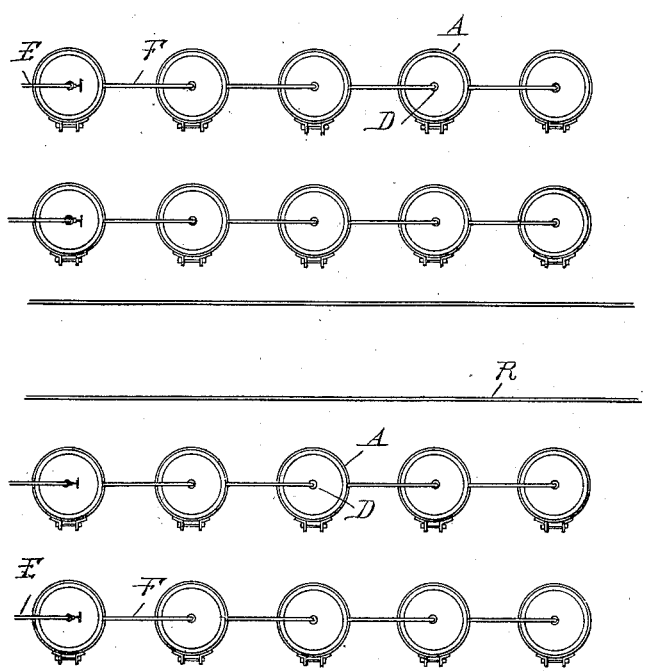
Inventor
Thomas Craney No. 626,972. Patented June 13, 1899.
T. CRANEY.
ELECTROLYTIC APPARATUS FOR DEPOSITION OF METALS FROM SOLUTION.
(Application filed Jan. 3, 1898.)
(No Model.) 2 Sheets—Sheet 2.
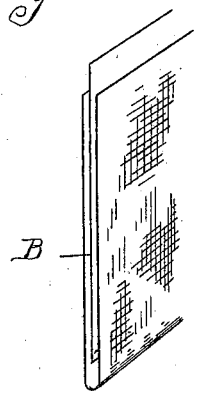
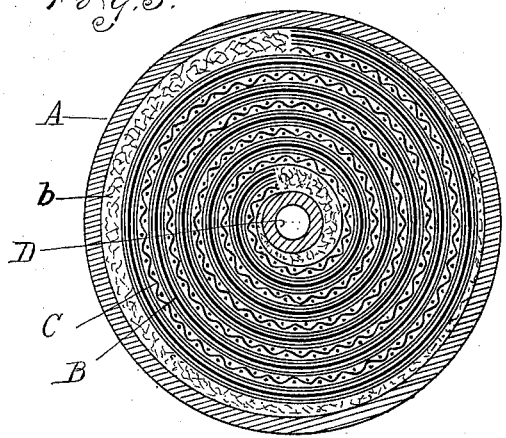
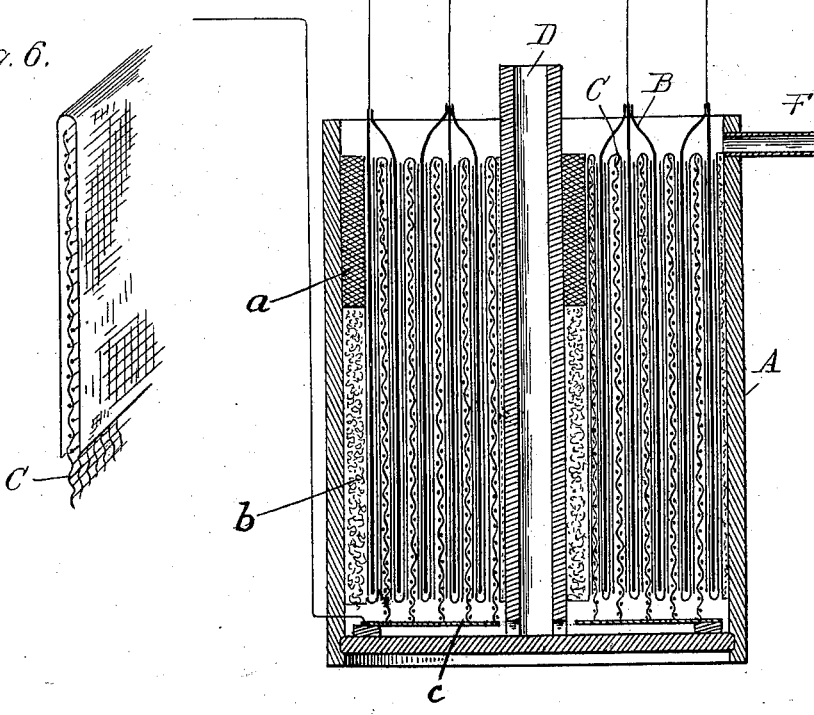
Inventor
Thomas Craney

UNITED STATES PATENT OFFICE.

THOMAS CRANEY, OF BAY CITY, MICHIGAN.

ELECTROLYTIC APPARATUS FOR DEPOSITION OF METALS FROM SOLUTION.

SPECIFICATION forming part of Letters Patent No. 626,972, dated June 13, 1899.

Application filed January 3, 1898. Serial No. 665,423. (No model.)

*To all whom it may concern:*

Be it known that I, THOMAS CRANEY, a citizen of the United States, residing at Bay City, in the county of Bay and State of Michigan, have invented certain new and useful Improvements in Electrolytic Apparatus for the Deposition of Metals from Solution, of which the following is a specification, reference being had therein to the accompanying drawings.

My invention is designed for electrolyzing metallic salts in solution, and especially for the recovery of the precious metals obtained in solution by the so-called "wet" process, as in the process of extracting gold from its ores with cyanid of potassium.

In the usual process of extracting gold or other metals from solutions on a large commercial scale the metal is precipitated by means of another more soluble and cheaper metal; but it has been found that the complex nature of certain ores or the resultant solution renders such recovery very difficult and expensive.

The object of my invention is to obtain the metal to be recovered by the electrolytic process and to devise for the purpose an apparatus of simple construction and operation and specifically adapted to electrolyze the cyanid solution of gold on any desired commercial scale commensurate with the requirements of a large mining plant.

To this end my invention consists in a novel construction, arrangement, and operation of the apparatus as a whole, whereby it is especially adapted for use on a large commercial scale, and, further, in the specific construction of the electrolytic unit and the electrodes thereof by which I have succeeded in largely reducing the cost of building and maintaining such a plant, all as more fully hereinafter described.

In the drawings, Figure 1 is an elevation of an electrolytic apparatus composed of a series of electrolytic units embodying my invention. Fig. 2 is a plan view thereof. Fig. 3 is a horizontal section of one of the electrolytic tanks. Fig. 4 is a vertical central section thereof, and Figs. 5 and 6 are perspective views illustrating the peculiar construction of the electrodes.

The electrolytic unit or tank which I employ consists of a tank or jar A, preferably of a cylindrical form and inclosing two electrodes B and C, rolled around a central hollow core D. The electrode forming the cathode consists of thin foil of the metal adapted for electrolytic deposition of the metal to be recovered, lead-foil being the preferable metal in the case of recovering gold from its solution, and for the anode I use thin sheet-iron, or preferably wire screen, which in the matter of cost I have found to be most economical. In forming an electrolytic couple of this form of anode and cathode I inclose the foil between the folds of a suitable fabric, preferably cotton cloth, so as to inclose it on both sides, leaving a small margin of the foil projecting at the open end of the fold. The anode I inclose in a similar manner, and then I roll the two together around the hollow core in such manner that the marginal projections of the foil appear at one end and the marginal portions of the anode at the other end. In such manner I form a tight roll of a size admitting of placing the roll loosely into the tank and sealing the space between it and the tank by means of any suitable plastic material, such as tar or asphalt or like material, which will prevent any liquid from passing between the roll and the tank. In the drawings the sealing is shown to be composed of two different layers, $a$ representing paraffin and $b$ mineral wool. Electric connection is made with the anode and cathode in any suitable manner by connecting the wires metallically with the projecting ends of the anode and cathode. In the drawings the projecting ends of the anode are shown secured to a metallic plate $c$ on the bottom of the tank. In practice I use any desired number of these electrolytic units and place them preferably, as shown in Fig. 1, at a gradually-descending height to provide for the flow of the solution to be decomposed from one into the other in series, as shown in the drawings, wherein E is the feed-pipe, which conducts the solution into the hollow core of the highest tank, from which after penetrating upwardly through the porous medium between the electrodes it is conducted by an overflow-pipe F into the hollow core of the next highest tank, and so on from one tank into the other, a sufficient number of tanks being connected in this manner to effect the complete electrodecomposition of the salt. In the commercial exploitation of my process I arrange the tanks in parallel rows on opposite sides of a tramway R, so that they may be readily removed and replaced for cleaning up the gold by means of a car having a derrick S' for handling the tanks on and off. The removal of the cathode is quickly effected by taking out the roll, unrolling it, and shaking out the foil from the folds. At the same time by inserting a fresh roll the tank is ready for further use. The final recovery of the gold is effected in the usual manner by cupeling or otherwise, and it will thus be seen that the apparatus may be kept uninterruptedly and continuously at work by the use of a suitable large number of units and by removing and replacing the units in the regular order in which they become charged. In my construction the foil may be of the thinnest possible description and the screen may be of the cheapest and lightest kind, thereby forming electrodes with a maximum of surface at a minimum of weight and expense and in the most compact and simple form. It will further be seen that the internal resistance is greatly reduced and the amount of liquid held by each tank compared with the superficial area of the electrodes is relatively small, whereby the electric deposition is accomplished more rapidly and more effectively than would be otherwise the case, and the capacity for doing work on a large scale of operation is therefore obvious.

It is obvious that instead of forming the electrodes into a round roll they may be rolled around a core of different form and produce a polygonal form using a similar-shaped tank in connection therewith. Any of these constructions by which the electrodes are associated together in a tight bundle in parallelism to each other would comply with the spirit of my invention, irrespective whether the core is hollow and serves as a feed-pipe or not, as it is obvious that the liquid can be supplied into the bottom of the tank through other feed connections. It is also within the spirit of my invention to feed the solution into the top and draw it off from the bottom.

What I claim as my invention is—

1. In an electrolytic apparatus, the combination of the outer tank, an overflow-pipe therefrom, a hollow open-ended feed-pipe in the center of the tank, and an anode and cathodes mechanically combined therewith and forming with it a removable unit of the apparatus.

2. In an electrolytic apparatus, the combination of the outer tank, an overflow-pipe therefrom, a hollow feed-pipe and electrodes wrapped around said feed-pipe and forming a removable unit therewith.

3. In an electrolytic apparatus, the combination of the outer tank, the overflow-pipe therefrom, the feed-pipe centrally of the tank, the electrodes wrapped around the feed-pipe and forming in connection therewith a removable unit of corresponding but smaller cross-section with the tank and a sealing in the space between the electrodes and the tank.

4. In an electrolytic apparatus, the combination of an outer tank, an overflow-pipe therefrom, an open-ended feed-pipe centrally of the tank and extending above the same, sheet-electrodes separated by a porous medium coiled around said pipe and forming in connection therewith a removable unit sealed within the tank and an overflow-pipe from the top of the tank.

5. In an electrolytic apparatus, the combination of a tank, an electrolytic couple comprising an anode and a cathode, each composed of thin sheet metal or its equivalent, inclosed within the folds of a cotton sheet or similar fabric, and a hollow core forming a central support upon which said anode and cathode are jointly wound, said core anode and cathode forming a removable unit of the apparatus conformable to the shape of the tank and supported in position therein by the walls of the tank.

6. In an electrolytic apparatus, the combination with the tank, of an anode and cathode therein, composed of wire screen and lead-foil respectively, each inclosed between cotton cloth with marginal projections extending oppositely therefrom and wound upon a hollow core into a tight roll conformable to the interior of the tank and sealed within said tank.

7. In an electrolytic apparatus, the combination of a series of electrolytic units, each composed of a tank, a hollow feed-pipe centrally thereof, electrodes separated by a porous medium and filling in connection therewith the interior space between the feed-pipes and tank, overflow-pipes leading from one tank into the feed-pipe of the next tank, and a supply-pipe for the electrolyte into one of the tanks, the relative arrangement of the tanks and their connection being such as to provide a continuous flow of the electrolyte through all the tanks of the series.

8. In an electrolytic apparatus, the combination of an outer tank provided with suitable feed and discharge connections for the liquid into the bottom and top respectively, and an electrolytic couple, composed of sheet or analogous electrodes each folded in a fabric, with oppositely-projecting marginal portions and rolled together into a tight bundle and sealed in the tank, whereby the fabric inclosing the electrode forms a porous medium through which the electrode is compelled to flow.

9. In an electrolytic apparatus, an electrolytic couple comprising two electrodes of sheet or analogous form, each inclosed in the folds of a fabric with projecting marginal portions and rolled together into a tight bundle with the electrodes in parallelism to each other and with their marginal projections at opposite ends thereof.

In testimony whereof I affix my signature in presence of two witnesses.

THOMAS CRANEY.

Witnesses:
M. B. O'DOGHERTY,
OTTO F. BARTHEL.